(12) United States Patent
Tanaka

(10) Patent No.: US 11,398,699 B2
(45) Date of Patent: Jul. 26, 2022

(54) POWER SUPPLY INTEGRATED VACUUM PUMP

(71) Applicant: SHIMADZU CORPORATION, Kyoto (JP)

(72) Inventor: Shingo Tanaka, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 266 days.

(21) Appl. No.: 16/837,136

(22) Filed: Apr. 1, 2020

(65) Prior Publication Data

US 2020/0335902 A1 Oct. 22, 2020

(30) Foreign Application Priority Data

Apr. 17, 2019 (JP) .............................. JP2019-078660

(51) Int. Cl.
| | |
|---|---|
| *F04D 19/04* | (2006.01) |
| *F04D 29/58* | (2006.01) |
| *H01R 13/533* | (2006.01) |
| *H02G 3/22* | (2006.01) |

(52) U.S. Cl.
CPC ......... *H01R 13/533* (2013.01); *F04D 19/042* (2013.01); *F04D 29/5806* (2013.01); *H02G 3/22* (2013.01); *F05B 2240/14* (2013.01); *F05B 2240/51* (2013.01); *F05B 2240/57* (2013.01)

(58) Field of Classification Search
CPC .... F04D 19/04; F04D 19/042; F04D 29/5813; F04D 29/5806; F04D 25/0693
See application file for complete search history.

(56) References Cited

U.S. PATENT DOCUMENTS

| 8,961,105 | B2* | 2/2015 | Kogame | ................. F04D 19/04 |
|---|---|---|---|---|
| | | | | 415/55.1 |
| 2012/0034066 | A1 | 2/2012 | Kogame | |
| 2013/0189089 | A1 | 7/2013 | Schroder et al. | |
| 2013/0189090 | A1* | 7/2013 | Okudera | ............... F04D 19/042 |
| | | | | 415/182.1 |
| 2018/0245603 | A1* | 8/2018 | Watanabe | ............. F04D 29/584 |
| 2018/0306204 | A1 | 10/2018 | Sakai et al. | |

(Continued)

FOREIGN PATENT DOCUMENTS

| CN | 103228923 A | 7/2013 |
|---|---|---|
| CN | 108730205 A | 11/2018 |
| JP | 2006250033 A | 9/2006 |

(Continued)

OTHER PUBLICATIONS

Office Action for corresponding CN Application No. 2020101629143 dated Jun. 2, 2021, with English language translation.

(Continued)

*Primary Examiner* — Topaz L. Elliott
*Assistant Examiner* — Jackson N Gillenwaters
(74) *Attorney, Agent, or Firm* — Renner, Otto, Boisselle & Sklar, LLP

(57) ABSTRACT

A power supply integrated vacuum pump comprises: a pump housing in which a pump rotor is arranged; a power supply housing fixed to an outer surface of the pump housing; a connector configured to connect a pump-housing-side line and a power-supply-housing-side line; and a spacer fixed to the outer surface of the pump housing and having a connector fixing surface to which the connector is fixed.

8 Claims, 8 Drawing Sheets

(56) References Cited

U.S. PATENT DOCUMENTS

2019/0242387 A1* 8/2019 Saegusa ................. F04B 37/16
2020/0099179 A1* 3/2020 Sun ....................... H01R 12/75

FOREIGN PATENT DOCUMENTS

| JP | 2012017673 A | 1/2012 |
| JP | 2018109371 A | 7/2018 |
| JP | 2018-184874 A1 | 11/2018 |

OTHER PUBLICATIONS

Office Action for corresponding CN Application No. 202010162914.3 dated Jan. 17, 2022, with English language translation.
Office Action for corresponding JP Application No. 2019-078660 dated Apr. 19, 2022, with English language machine translation.

\* cited by examiner (PLAN VIEW)

(A-A SECTIONAL VIEW)

POWER SUPPLY INTEGRATED VACUUM PUMP

BACKGROUND OF THE INVENTION

1. Technical Field

The present invention relates to a power supply integrated vacuum pump.

2. Background Art

Typically, a power supply integrated turbo-molecular pump configured such that a pump main body and a power supply portion are integrated with each other has been known (see, e.g., Patent Literature 1 (JP 2018-184874 A)). In the power supply integrated turbo-molecular pump described in Patent Literature 1, a connector to which a pump-main-body-side line is connected is directly fixed to an outer surface of the pump main body. A power supply portion side is under atmospheric pressure environment, but a pump base side is under vacuum environment. Thus, a hermetic seal connector is used as the connector.

SUMMARY OF THE INVENTION

In the above-described power supply integrated turbo-molecular pump, when the power supply portion is fixed to the pump main body, a defect that part of a power-supply-side line connected to the connector fixed to the pump main body protrudes from a power supply portion housing and is tucked between the pump main body or the connector and the power supply portion housing is easily caused.

A power supply integrated vacuum pump comprises: a pump housing in which a pump rotor is arranged; a power supply housing fixed to an outer surface of the pump housing; a connector configured to connect a pump-housing-side line and a power-supply-housing-side line; and a spacer fixed to the outer surface of the pump housing and having a connector fixing surface to which the connector is fixed.

According to the present invention, tucking of a line upon fixing of a power supply portion can be reduced.

DETAILED DESCRIPTION OF THE EXEMPLARY EMBODIMENTS

Figure 1:
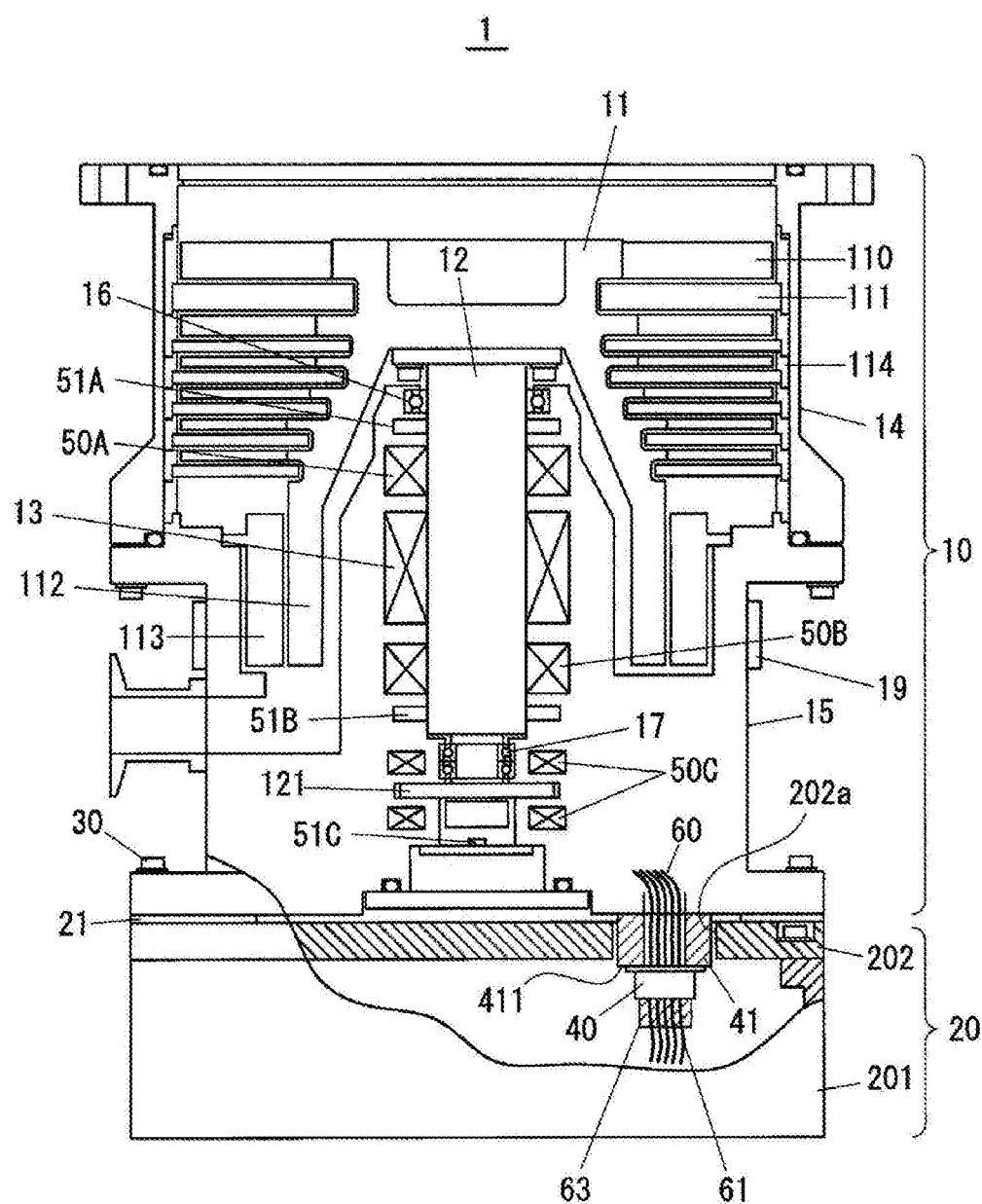
FIG. 1 is a sectional view of a schematic configuration of a power supply integrated turbo-molecular pump.

Hereinafter, a mode for carrying out the present invention will be described with reference to the drawings. FIG. 1 is a sectional view of a schematic configuration of a power supply integrated turbo-molecular pump 1 as one example of a power supply integrated vacuum pump. The power supply integrated turbo-molecular pump 1 illustrated in FIG. 1 is configured such that a pump main body 10 and a power supply portion 20 are integrally fixed to each other with bolts 30.

The pump main body 10 includes a pump case 14 and a pump base 15 forming a pump housing. In the pump main body 10, a shaft 12 attached to a pump rotor 11 is non-contact supported by magnetic bearings 50A, 50B, 50C provided at the pump base 15. A levitation position of the shaft 12 is detected by radial displacement sensors 51A, 51B and an axial displacement sensor 51C provided at the pump base 15. Note that in a state in which the magnetic bearings are not in operation, the shaft 12 is supported by mechanical bearings 16, 17.

A circular rotor disc 121 is provided at a lower end of the shaft 12, and electromagnets of the magnetic bearing 50C are provided to vertically sandwich the rotor disc 121 through a clearance. The magnetic bearing 50C attracts the rotor disc 121, thereby levitating the shaft 12 in an axial direction.

Multiple stages of rotor blades 110 are formed in a rotation axis direction at the pump rotor 11. A stationary blade 111 is arranged between adjacent ones of the vertically-arranged rotor blades 110. The rotor blades 110 and the stationary blades 111 form a turbine blade stage. Each stationary blade 111 is held with the stationary blade 111 being vertically sandwiched between spacers 114. The spacers 114 have not only the function of holding the stationary blades 111, but also the function of maintaining a gap between adjacent ones of the stationary blades 111 to a predetermined spacing.

A screw stator 113 forming a drag pump stage is provided at a subsequent stage (a lower side as viewed in the figure) of the stationary blades 111, and a gap is formed between an inner peripheral surface of the screw stator 113 and a cylindrical portion 112 of the pump rotor 11. The pump rotor 11 and the stationary blades 111 held by the spacers 114 are housed in the pump case 14. At the outer periphery of the pump base 15, a heater 19 configured to adjust the pump base 15 to a predetermined temperature is provided. Such temperature adjustment is performed for reducing deposition of a reactive product in the pump.

The power supply portion 20 is bolted to a bottom side of the pump base 15 as the pump housing. Although not shown in the figure, electronic components forming a main control section, a magnetic bearing control section, a motor control section and the like are provided at the power supply portion 20 configured to drivably control the pump main body 10, and these electronic components are housed in a housing of the power supply portion 20. The housing of the power supply portion 20 includes a power supply case 201 and a cooling jacket 202 covering an upper opening of the power supply case 201. At the pump base 15, a connector 40 configured to connect pump-side lines 60 and power-supply-side lines 61 is provided. In a region of the connector 40 connected to the power-supply-side lines 61, a mold member 63 configured to integrally hold the power-supply-side lines 61 is provided.

Figure 2:
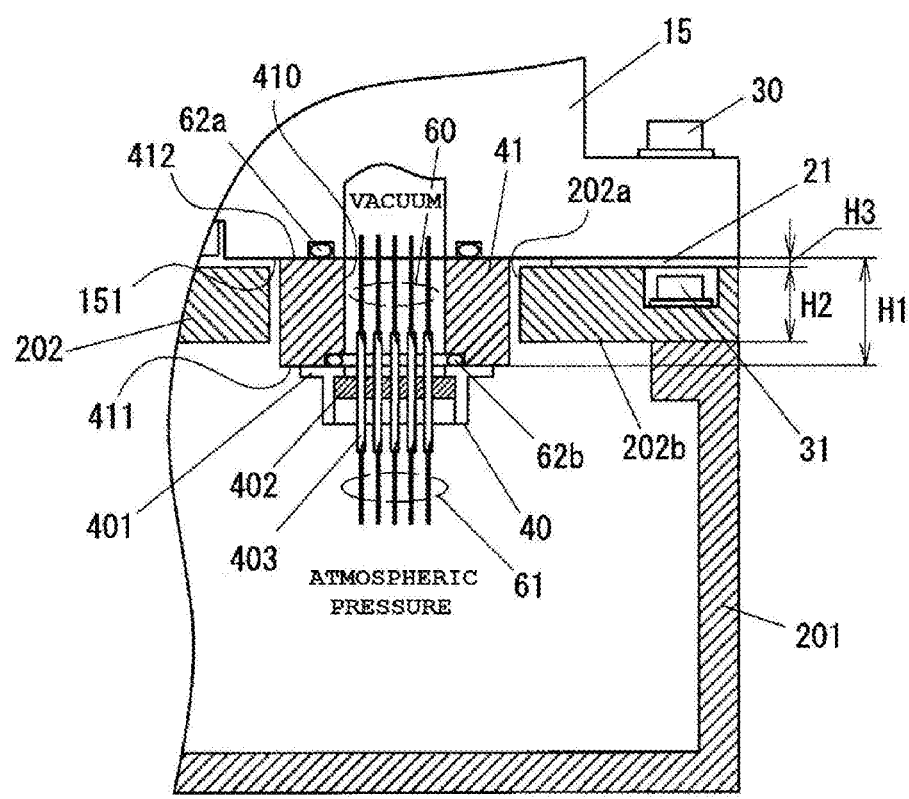
FIG. 2 is an enlarged view of a connection portion between a pump main body and a power supply portion.

FIG. 2 is an enlarged view of a connection portion provided by the connector 40. Note that in FIG. 2, the mold member 63 illustrated in FIG. 1 is not shown. The cooling jacket 202 is for cooling the power supply portion 20, and a heat insulating plate 21 is provided between the cooling jacket 202 and the pump base 15 for which temperature adjustment is performed. A material (e.g., ceramics or a resin material) having a low coefficient of thermal conductivity is used for the heat insulating plate 21. A connector spacer 41 is fixed to the pump base 15 at a bottom surface 151 facing the cooling jacket 202. The connector 40 is fixed to a connector fixing surface 411 of the connector spacer 41.

In an example illustrated in FIG. 2, the thicknesses H1, H2, H3 of the connector spacer 41, the cooling jacket 202, and the heat insulating plate 21 are set as in H1>H2+H3. The thickness H1 is preferably set to H1≥H2+H3 as described later. With this setting, the connector fixing surface 411 of the connector spacer 41 inserted through an opening 202a of the cooling jacket 202 is flush with an inner peripheral surface 202b of the cooling jacket 202, or protrudes from the inner peripheral surface 202b. A portion between the connector spacer 41 and the pump base 15 is sealed by a vacuum seal 62a, and a portion between the connector 40 and the connector spacer 41 is sealed by a vacuum seal 62b.

Regarding the connector 40, a pump-side space where the pump-side lines 60 are provided is in vacuum, and a power-supply-side space where the power-supply-side lines 61 are provided is under atmospheric pressure. Thus, a hermetic seal connector is used as the connector 40. The connector 40 is configured such that a sealing member 402 is provided in a shell 401 provided with a flange and multiple connector pins 403 are provided to penetrate the sealing member 402. The connector 40 is a feedthrough connector, and the pump-side lines 60 and the power-supply-side lines 61 are soldered to the connector pins 403. The above-described vacuum seal 62b is provided between the shell 401 of the connector 40 and the connector spacer 41.

Figure 3:
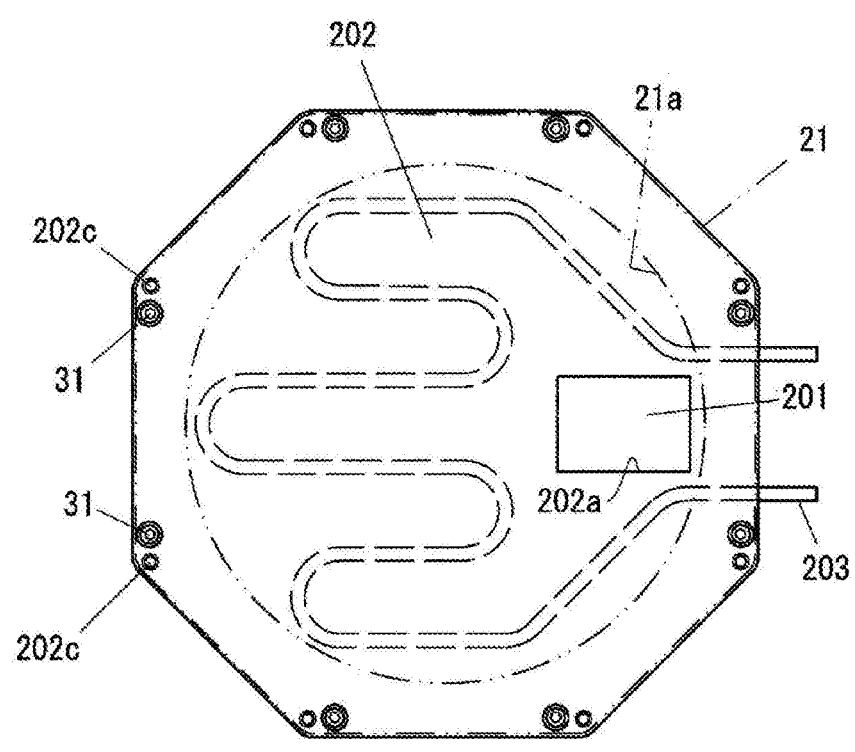
FIG. 3 is a plan view of the power supply portion from a pump main body side.

FIG. 3 is a plan view of the power supply portion 20 from a pump main body 10 side. Note that in FIG. 3, the shape of the heat insulating plate 21 is indicated by an imaginary line (a chain double-dashed line). The planar shape of the power supply portion 20 is an octagon, and the octagonal cooling jacket 202 is fixed to the octagonal opening of the power supply case 201 with bolts 31. Eight screw holes 202c formed at the cooling jacket 202 are screw holes into which the bolts 30 (see FIGS. 1 and 2) for fixing the cooling jacket 202 to the pump base 15 are screwed.

A pipe 203 configured such that refrigerant flows in the pipe 203 is embedded in the cooling jacket 202. The heat insulating plate 21 indicated by the chain double-dashed line has an octagonal outer shape, and a circular hole 21a is formed inside the heat insulating plate 21. That is, the heat insulating plate 21 is provided in a peripheral region of the cooling jacket 202 to avoid the rectangular opening 202a.

Figure 4:
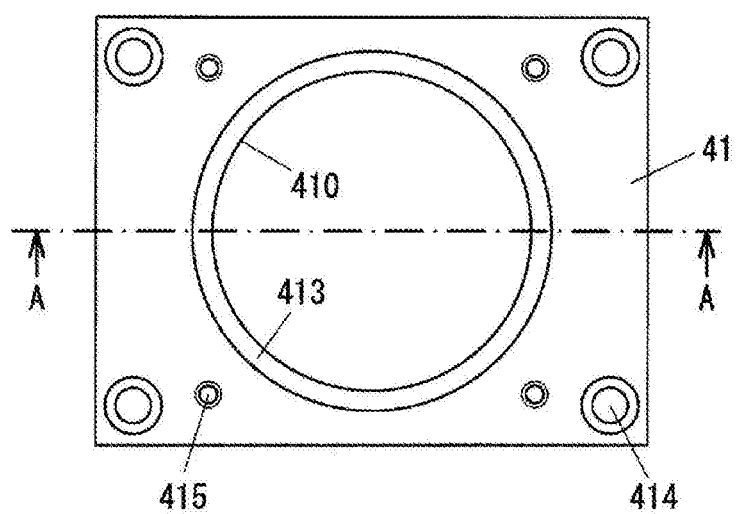
FIG. 4 is a plan view and an A-A sectional view of a connector spacer.
Figure 4:
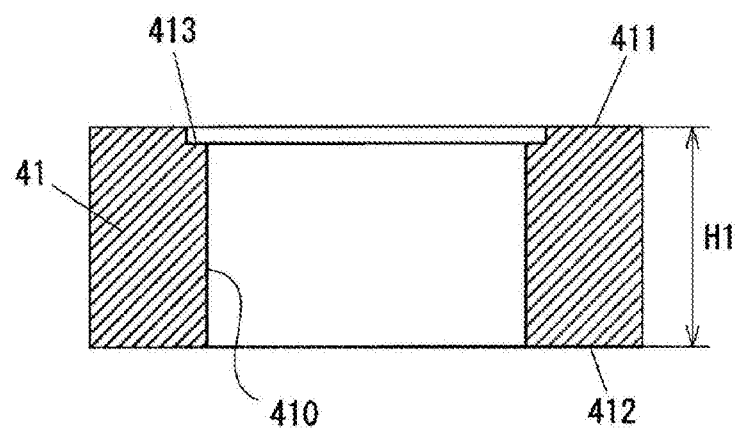

FIG. 4 illustrates a plan view and an A-A sectional view of the connector spacer 41. The shape of the connector spacer 41 in the plan view is a rectangular shape similar to that of the opening 202a of the cooling jacket 202, and a circular through-hole 410 for passage of the pump-side lines 60 is formed. At the connector fixing surface 411 to which the connector 40 is fixed, screw holes 415 for bolting the connector 40 and a seal surface 413 on which the vacuum seal (an O-ring) 62b is arranged are formed. Moreover, at four corners of the connector fixing surface 411, bolt holes 414 through which bolts for fixing the connector spacer 41 to the bottom surface 151 of the pump base 15 penetrate are formed. The above-described thickness H1 is a height dimension from the connector fixing surface 411 to a pump-side fixing surface 412.

(An Effect of the Connector Spacer 41)

In the present embodiment, the connector 40 is not directly fixed to the bottom surface 151 of the pump base 15, but is fixed through the connector spacer 41 as illustrated in FIG. 2. With this configuration, the position of the connector 40 can protrude from the bottom surface 151 of the pump base 15, and occurrence of a defect that the power-supply-side line 61 is tucked between the power supply portion 20 and the pump base 15 upon fixing of the power supply can be prevented.

Figure 5:
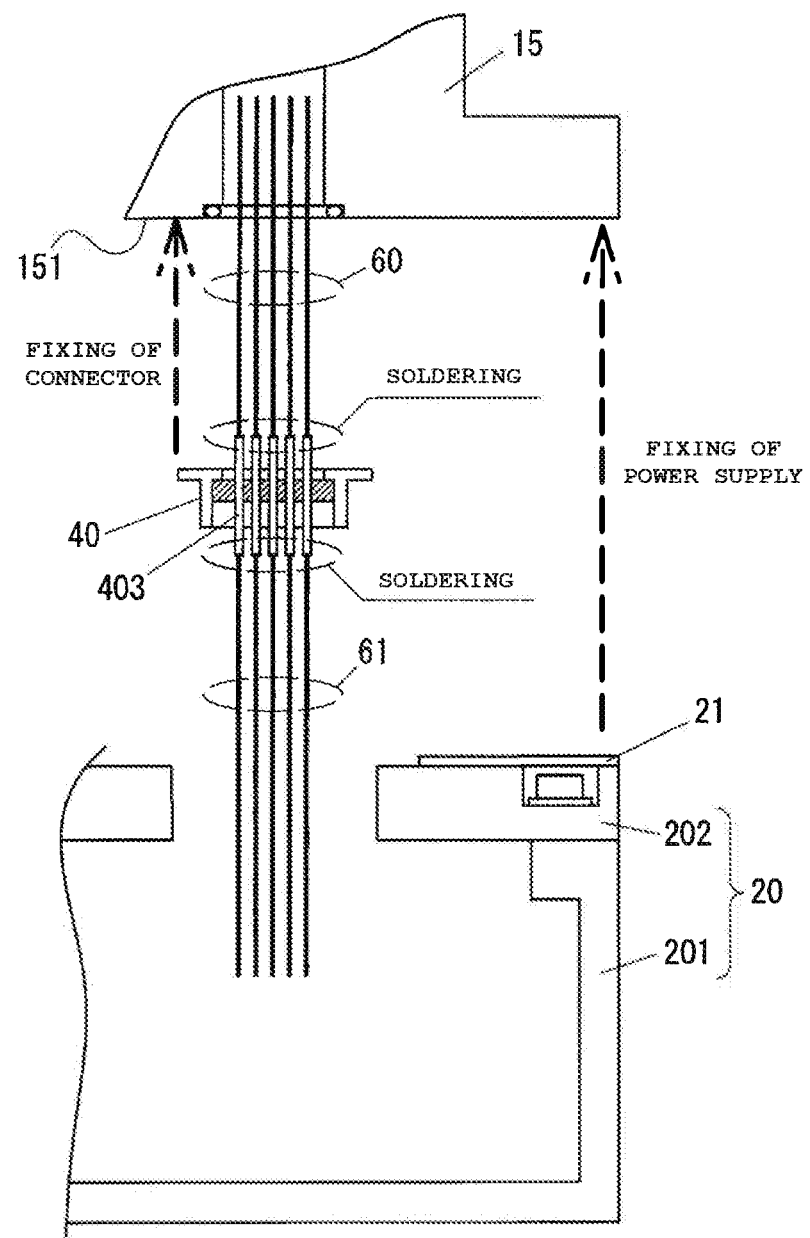
FIG. 5 is a view illustrating a state when lines are soldered to a connector.
Figure 6:
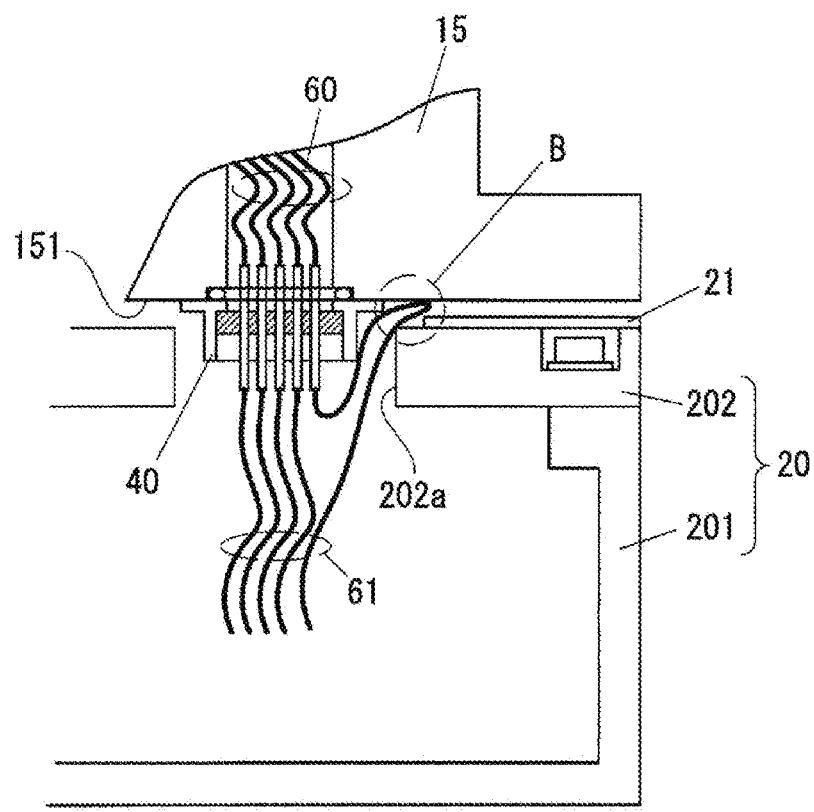
FIG. 6 is a view illustrating a situation when the power supply portion is fixed to the pump main body, FIG. 6 illustrating the case of using no connector spacer.
Figure 7:
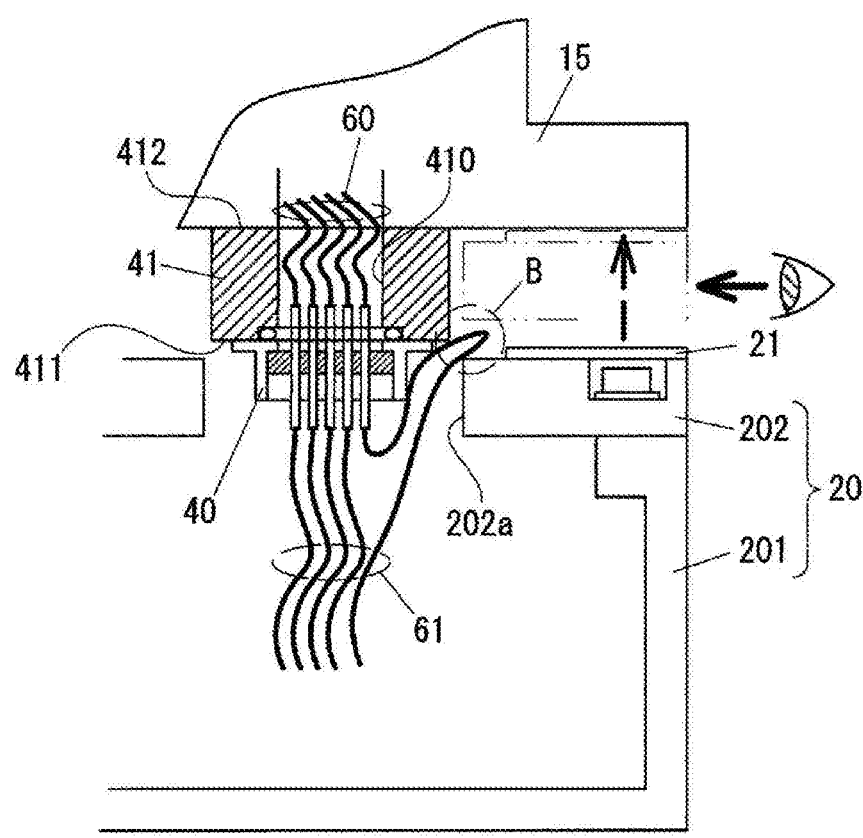
FIG. 7 is a view illustrating a situation when the power supply portion is fixed to the pump main body, FIG. 7 illustrating the case of using the connector spacer.

FIGS. 5 to 7 are views for describing a line tucking prevention effect. FIG. 5 is the view illustrating a state when the lines are soldered to the connector 40. FIGS. 6 and 7 are the views illustrating a situation when the power supply portion 20 is fixed to the pump base 15, FIG. 6 illustrating the case of using no connector spacer 41. Note that in FIGS. 5 to 7, the mold member 63 illustrated in FIG. 1 is not shown.

As illustrated in FIG. 5, in the case of soldering the pump-side lines 60 and the power-supply-side lines 61 to the connector pins 403 of the connector 40, the pump-side lines 60 and the power-supply-side lines 61 are drawn from the pump base 15 and the power supply portion 20 so that a soldering process can be facilitated. After soldering, the connector 40 is fixed to the bottom surface 151 of the pump base 15. Upon such fixing, the drawn pump-side lines 60 are, in a folded state, pushed into the pump main body.

Subsequently, the power supply portion 20 is fixed to the pump base 15. Upon such fixing, the drawn power-supply-side lines 61 are, in a folded state, pushed into the power supply housing, and as indicated by a chain double-dashed line, the power supply portion 20 is moved closer to a pump base 15 side and fixed. When the power supply portion 20 is moved closer to the pump base 15 side, part of the power-supply-side line 61 folded as in FIG. 6 is tucked between the cooling jacket 202 and the pump base 15 in some cases. Such tucking is visually checked through a clearance between the cooling jacket 202 and the pump base 15, but cannot be determined as long as the cooling jacket 202 is not positioned close to the pump base 15 as illustrated in FIG. 6.

The opening 202a is at a position apart from an outer peripheral surface of the cooling jacket 202, and therefore, there is a high probability that visual check is extremely difficult and tucking is overlooked in a state in which the cooling jacket 202 and the pump base 15 are positioned close to each other as in FIG. 6. In a case where the power-supply-side lines 61 are in the state illustrated in FIG. 6, when the power supply portion 20 closely contacts the pump base 15, a line portion indicated by a reference character B is not pulled into the power supply housing, but is tucked between the cooling jacket 202 and the pump base 15.

On the other hand, in the present embodiment, the connector spacer 41 is arranged between the connector 40 and the pump base 15. Thus, in a state in which the power supply portion 20 is fixed to the pump base 15, a spare portion of the connector 40 corresponding to the thickness H1 of the connector spacer 41 enters the power supply housing as compared to the case of using no connector spacer 41 as in FIG. 6. Thus, even if the power-supply-side line 61 comes, in the state illustrated in FIG. 7, out of the opening 202a to an extent similar to that of the case of FIG. 6, when the power supply portion 20 is moved closer to the pump base 15 until closely contacting the pump base 15, the portion of the power-supply-side line 61 indicated by the reference character B is pulled into the power supply housing. As a result, tucking of the power-supply-side line 61 is prevented.

Moreover, a clearance between the power supply portion 20 and the pump base 15 is larger than that of the case of FIG. 6, and therefore, the power-supply-side line 61 protruding from the opening 202a can be easily visually checked. For example, in a case where the power-supply-side line 61 comes out longer from the opening 202a as compared to the case illustrated in FIG. 7, when the power supply portion 20 is moved closer to the pump base 15 as indicated by the chain double-dashed line, there is a risk that part of the protruding power-supply-side line 61 is tucked between the power supply portion 20 and the pump base 15 without the power-supply-side line 61 being completely pulled into the power supply housing. In the present embodiment, in a state in which the connector 40 is almost entirely inserted into the opening 202a as in FIG. 6, the clearance between the power supply portion 20 and the pump base 15 is larger than that of the typical case. Thus, protrusion of the power-supply-side line 61 from the opening 202a can be easily checked, and the process of fixing the power supply portion 20 is performed again so that tucking of the power-supply-side line 61 can be prevented in advance.

The temperature of the pump base 15 is increased to 70 to 80° C. by temperature adjustment using the heater 19. In the present embodiment, the connector 40 is fixed to the pump base 15 through the connector spacer 41, and therefore, heat transfer from the pump base 15 to the connector 40 can be reduced as compared to the case of directly fixing the connector 40 to the pump base 15 as in FIG. 6 and an increase in the temperature of the connector 40 can be suppressed. An acceptable current value for the connector pin 403 decreases as a connector temperature increases. The connector temperature is suppressed low by the connector spacer 41 so that degradation of the acceptable current value due to a connector temperature increase can be prevented. Moreover, degradation of the durability and life of the connector 40 due to a connector temperature increase can be also prevented.

A metal material (e.g., a SUS material) having a lower coefficient of thermal conductivity than that of the pump base 15 generally using an aluminum material is used for the connector spacer 41, but the connector spacer 41 may be made of, e.g., a resin material. Moreover, a heat insulating member is arranged between the connector spacer 41 and the pump base 15 so that heat transfer can be further reduced. Note that in the case of arranging the heat insulating member, heat transfer can be reduced even in a case where the connector spacer 41 is made of an aluminum material similar to that of the pump base 15.

Further, when the connector 40 is fixed to the connector spacer 41, part of the pump-side lines 60 can be housed in the through-hole 410 of the connector spacer 41, and therefore, a line housing space on a pump main body side can be reduced.

In addition, in the case of the configuration illustrated in FIG. 6, a state in which the connector 40 is inserted into the opening 202a is not brought as long as the bottom surface 151 of the pump base 15 is not positioned much close to the cooling jacket 202. Thus, it is difficult to check a position relationship between the connector 40 and the opening 202a, and there is a probability that the connector 40 contacts the cooling jacket 202. On the other hand, in the case of using the connector spacer 41 as in FIG. 7, positioning of the connector 40 and the opening 202a is easily checked, and contact of the connector 40 with the opening 202a upon insertion can be prevented. Further, when insertion of the connector spacer 41 into the opening 202a begins, the connector spacer 41 functions as a guide, and therefore, no contact of the connector 40 with the opening 202a during an insertion process is caused. As described above, the connector spacer 41 is provided so that workability in a power supply portion fixing process can be improved.

Note that as illustrated in FIG. 1, molding is performed using the mold member 63 such that the mold member 63 includes a connection portion among the connector pins 403 and the power-supply-side lines 61. Thus, detachment of the power-supply-side lines 61 from the connector pins 403 can be prevented, and the entirety of the power-supply-side lines 61 is directed to the power supply housing. As a result, tucking of part of the power-supply-side line 61 as in FIG. 7 can be prevented.

(Modifications)

Figure 8:
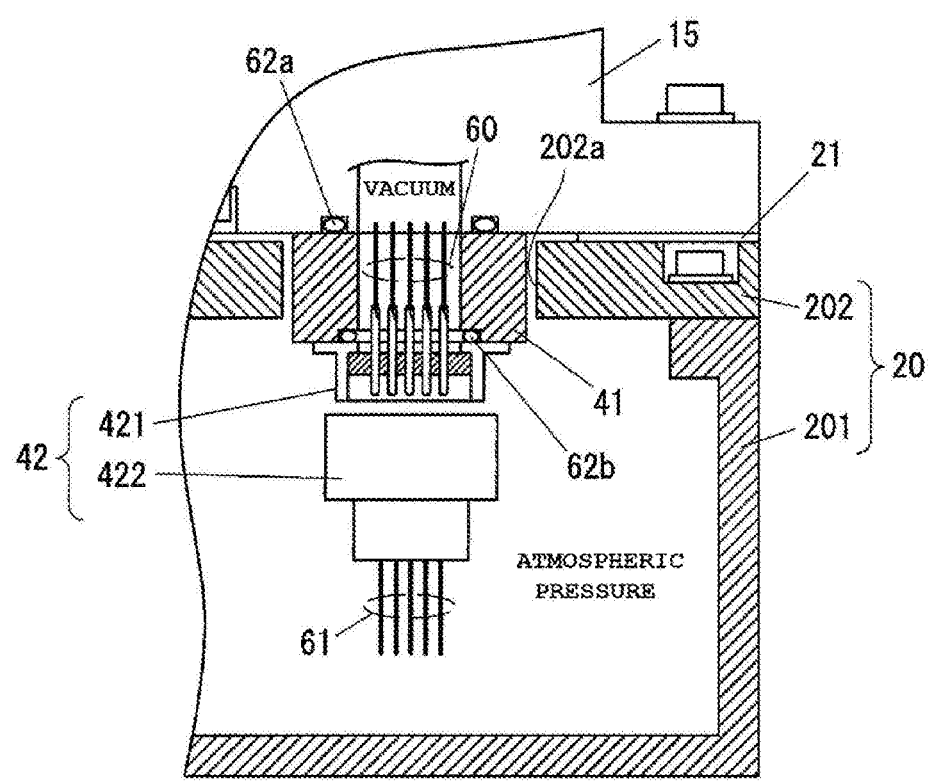
FIG. 8 is a view of a modification.

In the above-described embodiment, the connector 40 is the feedthrough connector configured such that the pump-side lines 60 are connected to a vacuum side of the connector pins 403 and the power-supply-side lines 61 are connected to an atmospheric pressure side as illustrated in FIG. 2. However, the configuration of the connector 40 is not limited to such a configuration, and may be a connector 42 including a receptacle 421 and a plug 422 detachable from each other as illustrated in FIG. 8. In this case, the receptacle 421 is fixed to the connector spacer 41.

Moreover, the single connector 40 may be divided into a connector for connecting a light electric (e.g., a sensor signal) line and a connector for connecting a strong electric (e.g., motor current, electromagnetic current) line.

It is understood by those skilled in the art that the above-described multiple exemplary embodiments and modifications are specific examples of the following aspects.

[1] A power supply integrated vacuum pump comprises: a pump housing in which a pump rotor is arranged; a power supply housing fixed to an outer surface of the pump housing; a connector configured to connect a pump-housing-side line and a power-supply-housing-side line; and a spacer fixed to the outer surface of the pump housing and having a connector fixing surface to which the connector is fixed.

As illustrated in FIGS. 5 to 7, the height of the connector 40 from the bottom surface 151 of the pump base 15 is increased by the connector spacer 41, and therefore, the amount of insertion of the connector 40 into the power supply housing through the opening 202a is increased. As a result, occurrence of tucking of the power-supply-side line 61 upon assembly of the power supply housing can be reduced. Further, when the connector 40 is fixed to the connector spacer 41, part of the pump-side lines 60 can be housed in the through-hole 410 as an internal space of the connector spacer 41, and therefore, the line housing space on the pump main body side can be reduced.

Moreover, as illustrated in FIG. 2, the connector spacer 41 as the spacer is provided so that heat transfer from the pump base 15 as the pump housing can be reduced and an increase in the temperature of the connector 40 can be suppressed. As a result, a decrease in the current capacity of the connector 40 and degradation of the connector durability can be prevented.

[2] A thickness of the spacer from a pump-side fixing surface to the connector fixing surface is set to equal to or greater than a dimension in a thickness direction from the outer surface of the pump housing to an inner peripheral surface of the power supply housing.

With these settings, the connector fixing surface 411 is, as in FIG. 2, flush with the inner peripheral surface 202b of the cooling jacket 202 as one example of the power supply housing, or protrudes inward of the power supply housing with respect to the inner peripheral surface 202b. As a result, line protrusion as indicated by the reference character B of FIG. 7 is eliminated when the power supply portion 20 closely contacts the pump base 15, and the effect of preventing tucking of the power-supply-side line 61 is improved.

[3] A coefficient of thermal conductivity of the spacer is lower than a coefficient of thermal conductivity of the pump housing.

The connector spacer 41 is interposed between the connector 40 and the pump base 15 so that the temperature of the connector 40 can be decreased due to thermal resistance of the connector spacer 41 as compared to the case of providing no connector spacer 41. Further, the coefficient of thermal conductivity of the connector spacer 41 is, as described above, set lower than the coefficient of thermal conductivity of the pump base 15 fixed to the connector spacer 41, and therefore, the temperature of the connector 40 can be further decreased. As a result, the effect of preventing a decrease in the current capacity of the connector 40 and degradation of the connector durability is further enhanced.

[4] The power supply integrated vacuum pump further comprises: a first vacuum seal configured to seal between the spacer and the pump housing; and a second vacuum seal configured to seal between the spacer and the connector.

As illustrated in FIG. 2, the vacuum seal 62a configured to seal between the connector spacer 41 and the pump base 15 and the vacuum seal 62b configured to seal between the connector spacer 41 and the connector 40 are provided so that entrance of air from a pump power supply side to a pump housing side can be reliably prevented, and therefore, an adverse effect on pump performance can be prevented.

[5] The power supply integrated vacuum pump further comprises: a heat insulating member provided between the pump housing and the power supply housing. A thickness of the spacer from a pump-side fixing surface to the connector fixing surface is set to equal to or greater than a sum of a thickness of the power supply housing and a thickness of the heat insulating member.

As illustrated in FIG. 2, the heat insulating plate 21 is provided as a heat insulating member between the pump housing and the power supply housing so that heat entrance from the pump base 15 to the power supply portion 20 can be reduced. In this case, the thickness H1 of the connector spacer 41 from the pump-side fixing surface 412 to the connector fixing surface 411 is set to equal to or greater than the sum of the thickness H2 of the cooling jacket 202 as one example of the power supply housing and the thickness H3 of the heat insulating plate 21, i.e., H1≥H2+H3. With such a setting, the connector fixing surface 411 of the connector spacer 41 is flush with the inner peripheral surface 202b of the cooling jacket 202, or protrudes from the inner peripheral surface 202b. Thus, tucking of the power-supply-side line 61 can be prevented.

Various embodiments and modifications have been described above, but the present invention is not limited to these contents. For example, in the above-described embodiment, the configuration in which the power supply portion 20 is fixed to the bottom surface 151 of the pump base 15 as illustrated in FIG. 1 has been described by way of example, but the connector spacer 41 can be similarly applied in the case of a structure in which the power supply portion 20 is fixed to a side surface of the pump base 15. Moreover, the present invention is not limited to the power supply integrated turbo-molecular pump, and can be similarly applied to a power supply integrated vacuum pump. Other aspects conceivable within the scope of the technical idea of the present invention are also included in the scope of the present invention.

What is claimed is:

1. A power supply integrated vacuum pump comprising:
   a pump housing in which a pump rotor is arranged;
   a power supply housing fixed to an outer surface of the pump housing;
   a connector configured to connect a pump-housing-side line and a power-supply-housing-side line; and
   a spacer fixed to the outer surface of the pump housing and having a connector fixing surface to which the connector is fixed
   wherein a thickness of the spacer from a pump-side fixing surface to the connector fixing surface is equal to or greater than a thickness defined by a distance between the outer surface of the pump housing to which the spacer is fixed, and an inner peripheral surface of a plate that constitutes part of the power supply housing, the plate facing the pump housing, the inner peripheral surface of the plate facing an internal space of the power supply housing.

2. The power supply integrated vacuum pump according to claim 1, wherein a coefficient of thermal conductivity of the spacer is lower than a coefficient of thermal conductivity of the pump housing.

3. The power supply integrated vacuum pump according to claim 1, further comprising:
   a first vacuum seal configured to seal between the spacer and the pump housing; and
   a second vacuum seal configured to seal between the spacer and the connector.

4. The power supply integrated vacuum pump according to claim 1, further comprising:
   a heat insulating plate provided between the pump housing and the power supply housing,
   wherein a thickness of the spacer from a pump-side fixing surface to the connector fixing surface is set to equal to or greater than a sum of a thickness of the power supply housing and a thickness of the heat insulating plate.

5. The power supply integrated vacuum pump according to claim 1, wherein
   the power supply housing includes a power supply case and a cooling jacket covering an upper opening of the power supply case, and
   the connector fixing surface of the spacer inserted through an opening of the cooling jacket is flush with an inner peripheral surface of the cooling jacket, or protrudes from the inner peripheral surface of the cooling jacket.

6. The power supply integrated vacuum pump according to claim 1, wherein
   the power supply housing includes a power supply case and a cooling jacket covering an upper opening of the power supply case,
   a heat insulating plate is provided between the cooling jacket and the pump housing, and
   a thickness of the spacer is greater than or equal to a sum of a thickness of the cooling jacket and a thickness of the heat insulating plate.

7. The power supply integrated vacuum pump according to claim 1, wherein
   the connector is a hermetic seal connector.

8. The power supply integrated vacuum pump according to claim 1, wherein
   the shape of the spacer in the plan view is a rectangular shape and a through-hole for passage of the pump-housing-side line is formed.

\* \* \* \* \*